US012800748B2

(12) United States Patent
Sekiguchi et al.

(10) Patent No.: US 12,800,748 B2
(45) Date of Patent: Nov. 17, 2026

(54) OBJECT DETECTOR

(71) Applicant: Mitsubishi Electric Corporation, Tokyo (JP)

(72) Inventors: Ryota Sekiguchi, Tokyo (JP); Tatsuya Kamimura, Tokyo (JP); Kosuke Yasooka, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 173 days.

(21) Appl. No.: 18/866,205

(22) PCT Filed: Jun. 13, 2022

(86) PCT No.: PCT/JP2022/023623
§ 371 (c)(1),
(2) Date: Nov. 15, 2024

(87) PCT Pub. No.: WO2023/242903
PCT Pub. Date: Dec. 21, 2023

(65) Prior Publication Data

US 2026/0186122 A1 Jul. 2, 2026

(51) Int. Cl.
*G01S 13/42* (2006.01)
*G01S 13/58* (2006.01)
(Continued)

(52) U.S. Cl.
CPC ............ *G01S 13/867* (2013.01); *G01S 13/42* (2013.01); *G01S 13/584* (2013.01); *G01S 13/88* (2013.01)

(58) Field of Classification Search
CPC ...... G01S 13/867; G01S 13/42; G01S 13/584; G01S 13/88
See application file for complete search history.

(56) References Cited

U.S. PATENT DOCUMENTS

| | | | |
|---|---|---|---|
| 8,924,140 | B2 | 12/2014 | Sakamoto et al. |
| 2014/0203959 | A1 | 7/2014 | Kriel et al. |

FOREIGN PATENT DOCUMENTS

| | | | | |
|---|---|---|---|---|
| CN | 114078326 A | 2/2022 | | |
| WO | 2010/119860 A1 | 10/2010 | | |
| WO | WO-2021259344 A1 * | 12/2021 | ......... | G06F 18/2148 |

OTHER PUBLICATIONS

Extended European Search Report issued Jun. 13, 2025 in European Patent Application No. 22946723.8, 9 pages.

(Continued)

*Primary Examiner* — Timothy A Brainard
*Assistant Examiner* — Bongani Jabulani Mashele
(74) *Attorney, Agent, or Firm* — XSENSUS LLP

(57) ABSTRACT

An object detector includes a radar signal processor that detects positions and speeds of an object and a structure by processing signals received from a radar, a camera image processor that detects positions and types of the object and the structure based on captured-image data from a camera and a pixel coordinate-position conversion table. The camera image processor includes the pixel coordinate-position conversion table. Further, there is and a fusion processor that performs identity determination processing, and uses a result of the identity determination processing for vehicle control. The camera image processor includes conversion table update circuitry that updates the pixel coordinate-position conversion table with data on correspondence between position data detected by the radar signal processor when the identity determination processing is successful and the pixel coordinates of the camera.

2 Claims, 3 Drawing Sheets

(51) Int. Cl.
*G01S 13/86* (2006.01)
*G01S 13/88* (2006.01)

(56) References Cited

OTHER PUBLICATIONS

International Search Report and Written Opinion mailed on Jul. 19, 2022, received for PCT Application PCT/JP2022/023623, filed on Jun. 13, 2022, 10 pages including English Translation.

* cited by examiner

OBJECT DETECTOR

CROSS-REFERENCE TO RELATED APPLICATION

This application is a national stage application, pursuant to 35 U.S.C. § 371, of International Patent Application No. PCT/JP2022/023623, filed Jun. 13, 2022, the entire contents of which are incorporated herein by reference.

FIELD

The present disclosure relates to an object detector to be installed in a vehicle.

BACKGROUND

An object detector to be installed in a vehicle has the functions of performing vehicle control and alarm notification by detecting a person, a structure, or the like existing in a vehicle use environment in a short time. Thus, the object detector to be installed in a vehicle contributes to safe driving of the vehicle. A sensor such as a radar, a camera, a Light Detection and Ranging (LiDAR), or an ultrasonic sensor is used for the object detector to be installed in a vehicle. Meanwhile, in recent years, a fusion-type object detector has been widely used which improves performance by combining a plurality of sensors.

In Patent Literature 1, whether an object to be detected is a pedestrian is determined on the basis of a position and a speed of the object detected by a radar and object recognition detected by a camera.

CITATION LIST

Patent Literature

Patent Literature 1: WO 2010/119860 A

SUMMARY OF INVENTION

Problem to be Solved by the Invention

A radar is excellent in detection accuracy of positions and speeds, and a camera is excellent in detection of object recognition. Therefore, in an object detector, a radar is generally adopted for position and speed detection, and a camera is generally adopted for object recognition. However, when an object to be detected such as a person approaches a structure having high radar reflection intensity, such as a utility pole, a wall, a guardrail, a pole of a shelf, a delineator, or a signal, radar signals reflected from the object to be detected are buried in radar signals reflected from the structure. Therefore, it becomes difficult to detect the object to be detected, and detection data on the object to be detected by the radar are lost. In this case, it is possible to maintain accuracy of detection by the fusion-type object detector by replacing detection data from a radar with detection data from a camera.

However, a camera such as a monocular camera, which is low in manufacturing cost, has lower accuracy in detecting a position of an object with respect to a vehicle than a stereo camera. Position detection accuracy of such a camera is deteriorated due to temperature, a change in camera characteristics due to aging, secular change in the position and orientation of a camera attached to a vehicle, blurring of a camera image due to vibration generated while the vehicle is traveling, or the like. Therefore, the fusion-type object detector has a problem in that when detection data from a radar are lost, an object cannot be detected with high accuracy even if the detection data from the radar are replaced with detection data from a camera.

The present disclosure has been made in view of the above, and an object of the present disclosure is to obtain an object detector capable of detecting an object with high accuracy when replacing detection data from a radar with detection data from a camera.

Means to Solve the Problem

To solve the above described problems and achieve the object, an object detector according to the present disclosure includes: a radar signal processor configured to detect positions and speeds of an object and a structure by processing signals received from a radar; a camera image processor including a first conversion table that stores a correspondence between pixel coordinates of the camera and positions with respect to a vehicle in an imaging space of the camera, and configured to detect positions and types of the object and the structure based on captured-image data from a camera and the first conversion table; and a fusion processor configured to perform first identity determination processing configured to determine whether the position of the object detected by the radar signal processor is identical to the position of the object detected by the camera image processor, perform second identity determination processing configured to determine whether the position of the structure detected by the radar signal processor is identical to the position of the structure detected by the camera image processor, and use a result of the first identity determination processing and a result of the second identity determination processing for vehicle control. The camera image processor includes a conversion table update circuitry configured to update the first conversion table with data on correspondence between position data detected by the radar signal processor, when the second identity determination processing is successful, and the pixel coordinates of the camera.

Effects of the Invention

The object detector according to the present disclosure has an effect of enabling an object to be detected with high detection accuracy when replacing detection data from a radar with detection data from a camera.

DESCRIPTION OF EMBODIMENTS

Hereinafter, an object detector according to an embodiment will be described in detail with reference to the drawings.

Embodiment

Figure 1:
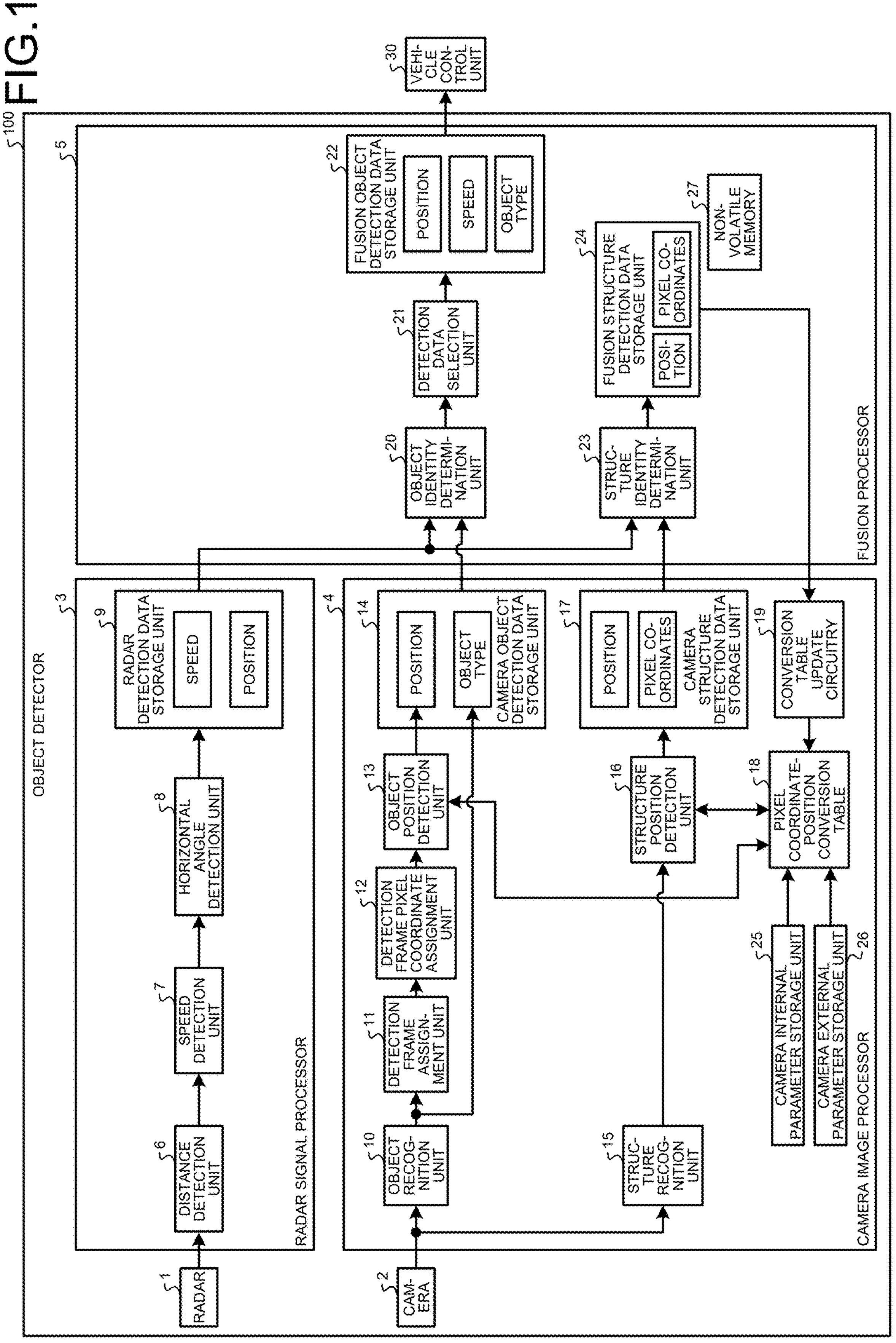
FIG. 1 is a block diagram illustrating a configuration of an object detector according to an embodiment.

FIG. 1 is a block diagram illustrating a configuration of an object detector according to an embodiment. An object detector 100 includes a radar 1, a camera 2, a radar signal processor 3, a camera image processor 4, and a fusion processor 5. The object detector 100 is installed in a vehicle. An output of the object detector 100 is input to a vehicle control unit 30 installed in the vehicle, and is used for controlling the vehicle.

The radar 1 emits electromagnetic waves to an object, and receives signals reflected from the object. The radar signal processor 3 detects a position and a speed of the object by performing signal processing on signals received from the radar 1. When used as a radar installed in a vehicle, the radar 1 generally uses a Frequency Modulated Continuous Wave (FMCW) method or a Fast Chirp Modulation (FCM) method, and includes a high-frequency semiconductor component, a power-supply semiconductor component, a substrate, a crystal device, a chip component, an antenna, and the like.

A micro control unit (MCU), a central processing unit (CPU), or the like are generally used as the radar signal processor 3. The radar signal processor 3 includes a distance detection unit 6, a speed detection unit 7, a horizontal angle detection unit 8, and a radar detection data storage unit 9. The distance detection unit 6, the speed detection unit 7, and the horizontal angle detection unit 8 perform fast Fourier transformation (FFT) in a distance direction, a speed direction, and a horizontal angle direction to detect distances to an object and a structure, speeds of the object and the structure, and horizontal angles of the object and the structure, respectively. Here, the object refers to an object desired to be detected in vehicle control, and corresponds to, for example, a person or a vehicle. The structure refers to an object that is not desired to be detected and is not necessarily used for vehicle control, and corresponds to, for example, a utility pole, a wall, a guardrail, a pole of a shelf, a delineator, or a signal.

The camera 2 images the object, and acquires image data. The camera 2 may be a stereo camera or a monocular camera. The camera image processor 4 detects positions and types of the object and the structure based on image data on images captured by the camera 2. Image data on images captured by the camera 2 are also referred to as captured-image data. The camera 2 includes components such as a lens, a holder, a complementary metal oxide semiconductor (CMOS) sensor, a power-supply semiconductor component, and a crystal device.

As the camera image processor 4, an MCU, a CPU, a graphics processing unit (GPU), or the like are used. The camera image processor 4 includes: an object recognition unit 10; a detection frame assignment unit 11; a detection frame pixel coordinate assignment unit 12; an object position detection unit 13; a camera object detection data storage unit 14; a structure recognition unit 15; a structure position detection unit 16; a camera structure detection data storage unit 17; a pixel coordinate-position conversion table 18; a conversion table update circuitry 19; a camera internal parameter storage unit 25; and a camera external parameter storage unit 26.

The object recognition unit 10 recognizes a person, a vehicle, or the like from the captured-image data and detects a type of the object by using feature data obtained by machine learning or deep learning as a database. The detection frame assignment unit 11 assigns a frame to a region of an object to be recognized on a captured image on the basis of an object recognition result obtained by the object recognition unit 10. The assigned frame is referred to as a detection frame. The detection frame pixel coordinate assignment unit 12 assigns pixel coordinates of captured-image data to a bottom side center point of the detection frame.

The pixel coordinate-position conversion table 18 corresponding to a first conversion table stores correspondence data representing a correspondence relationship between a plurality of pixel coordinates of the camera 2 and positions with respect to a vehicle in an imaging space of the camera 2. A position (position relative to the vehicle) associated with each pixel coordinate is set on the assumption that a lowermost portion of the object or a lowermost portion of the structure is located on each pixel coordinate of the imaging space of the camera 2. Therefore, in the pixel coordinate-position conversion table 18, position data associated with each pixel coordinate indicates position data on the object or the structure with respect to the vehicle in the imaging space.

The object position detection unit 13 detects the position of the object with respect to the vehicle by converting the detection frame portion into position data on the object with reference to the pixel coordinate-position conversion table 18 based on the pixel coordinates of a detection frame portion obtained by the detection frame pixel coordinate assignment unit 12. The camera object detection data storage unit 14 stores an object type obtained by the object recognition unit 10 and the position of the object obtained by the object position detection unit 13, and outputs the object type and the position of the object to the fusion processor 5 in a subsequent stage.

The structure recognition unit 15 extracts a spot with high linearity from the captured-image data to detect a vertical component, with respect to a vehicle traveling road surface, for an edge of a structure such as a utility pole, a wall, a guardrail, a pole of a shelf, a delineator, or a signal. For example, Hough transform is performed on the captured-image data. Thus, only an edge having high linearity is detected from the captured-image data to extract a vertical component with respect to the vehicle traveling road surface. With regard to the vertical component of the straight-line edge obtained by the structure recognition unit 15, the structure position detection unit 16 detects the position of the structure with reference to the pixel coordinate-position conversion table 18 for a lowest point closest to the vehicle road surface on the image. The camera structure detection data storage unit 17 stores the position and pixel coordinates of the structure obtained by the structure position detection unit 16, and outputs the position and the pixel coordinates to the fusion processor 5 in a subsequent stage.

The conversion table update circuitry 19 maintains accuracy of position detection by the camera 2 by updating the pixel coordinate-position conversion table 18 on the basis of fusion structure detection data (the position data detected by the radar 1 and the data on the pixel coordinates of the camera 2) regarding the structure obtained from a fusion structure detection data storage unit 24 of the fusion processor 5.

The camera internal parameter storage unit 25 stores camera internal parameters determined from a lens and a CMOS sensor included in the camera 2. The camera internal parameters include a focal length, an image data size, a pixel center, a lens distortion coefficient, and the like. The camera internal parameters are adjusted for each apparatus at the time of product shipment inspection, and are stored in the camera internal parameter storage unit 25.

The camera external parameter storage unit 26 stores camera external parameters. The camera external parameters include an attachment position, an attitude angle, and the like of the camera 2 after attached to the vehicle. The camera external parameters are adjusted for each apparatus at the time of product shipment inspection, and are stored in the camera external parameter storage unit 26.

The camera internal parameters vary with temperature and aging. Furthermore, the camera external parameters vary due to secular change in the position and orientation of the camera 2, blurring of an image due to vibration generated while the vehicle is traveling, or the like. Therefore, the camera internal parameters stored in the camera internal parameter storage unit 25 and the camera external parameters stored in the camera external parameter storage unit 26 are referred to at the time of position detection in the object position detection unit 13 and structure position detection in the structure position detection unit 16 only in an initial state immediately after attachment of the camera 2 to the vehicle. After the initial state, the object position detection unit 13 and the structure position detection unit 16 detect positions of the object and the structure, respectively, with reference to the pixel coordinate-position conversion table 18 sequentially updated by the conversion table update circuitry 19, instead of referring to the camera internal parameters stored in the camera internal parameter storage unit 25 and the camera external parameters stored in the camera external parameter storage unit 26.

The fusion processor 5 includes: an object identity determination unit 20; a detection data selection unit 21; a fusion object detection data storage unit 22; a structure identity determination unit 23; the fusion structure detection data storage unit 24; and a nonvolatile memory 27.

The object identity determination unit 20 performs identity determination processing for determining whether the position of the object detected by the radar 1 is identical to the position of the object detected by the camera 2. The identity determination processing to be performed in the object identity determination unit 20 corresponds to a first identity determination processing. As a result of this identity determination processing, position and speed data detected by the radar 1 and object recognition data detected by the camera 2 are associated with each other. In a case where the identity determination is successful, the detection data selection unit 21 transfers the position and the speed detected by the radar 1 and the object type detected by the camera 2 to the fusion object detection data storage unit 22. Meanwhile, in a case where the identity determination is unsuccessful, the detection data selection unit 21 considers data on detection by the radar 1 to be lost, and transfers only the position and the object type detected by the camera 2 to the fusion object detection data storage unit 22. The fusion object detection data storage unit 22 stores data on the position, the speed, and the object type, and transfers the data to the vehicle control unit 30 for use in vehicle control.

The structure identity determination unit 23 performs identity determination processing for determining whether the position of the structure detected by the radar 1 is identical to the position of the structure detected by the camera 2. The identity determination processing to be performed in the structure identity determination unit 23 corresponds to a second identity determination processing. As a result of this identity determination processing, the position data detected by the radar 1 and the pixel coordinates of the structure detected by the camera 2 are associated with each other. When the identity determination is successful, the position detected by the radar 1 and the pixel coordinates of the structure detected by the camera 2 are stored as fusion structure detection data in the fusion structure detection data storage unit 24. The fusion structure detection data storage unit 24 transfers the fusion structure detection data (the position detected by the radar 1 and the pixel coordinates of the structure detected by the camera 2) to the conversion table update circuitry 19 of the camera image processor 4. The nonvolatile memory 27 stores data stored in the fusion structure detection data storage unit 24. When no structure exists, or when the structure identity determination unit 23 is unsuccessful in the identity determination processing, data stored in the nonvolatile memory 27 are used to update the pixel coordinate-position conversion table 18.

In the embodiment, the structure identity determination unit 23 performs the identity determination processing for determining whether the position of the structure detected by the radar 1 is identical to the position of the structure detected by the camera 2, and the pixel coordinate-position conversion table 18 is sequentially updated on a real-time basis with the fusion structure detection data (the position of the structure detected by the radar 1 and the pixel coordinates of the structure detected by the camera 2) stored when identity determination is successful.

Figure 2:
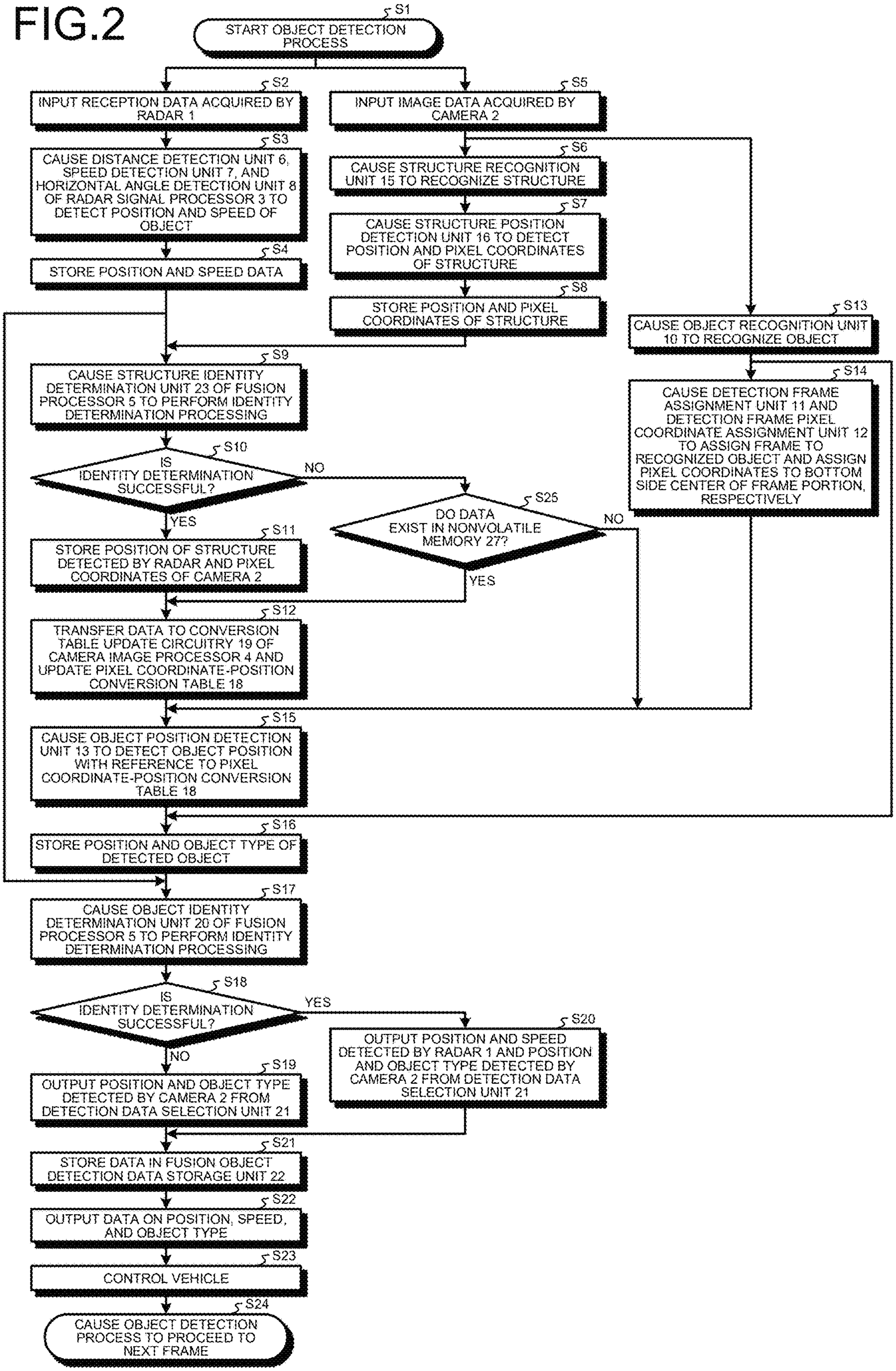
FIG. 2 is a flowchart illustrating an operation procedure of the object detector according to the embodiment.

FIG. 2 is a flowchart illustrating an operation procedure of the object detector 100 according to the embodiment. Operation of the object detector 100 will be described with reference to FIG. 2. When an object detection process is started (step S1), reception data acquired by the radar 1 are input to the radar signal processor 3 (step S2). The distance detection unit 6, the speed detection unit 7, and the horizontal angle detection unit 8 of the radar signal processor 3 detect a position and a speed of an object (step S3). Position and speed data having been detected are stored in the radar detection data storage unit 9 (step S4).

Meanwhile, when the object detection process is started (step S1), captured-image data acquired by the camera 2 are input to the camera image processor 4 (step S5). The structure recognition unit 15 of the camera image processor 4 recognizes a structure on the basis of the captured-image data having been acquired (step S6). Thereafter, the structure position detection unit 16 detects a position and pixel coordinates of the structure on the basis of the captured-image data and the pixel coordinate-position conversion table 18 (step S7). The position and pixel coordinates of the structure are stored in the camera structure detection data storage unit 17 (step S8).

Figure 3:
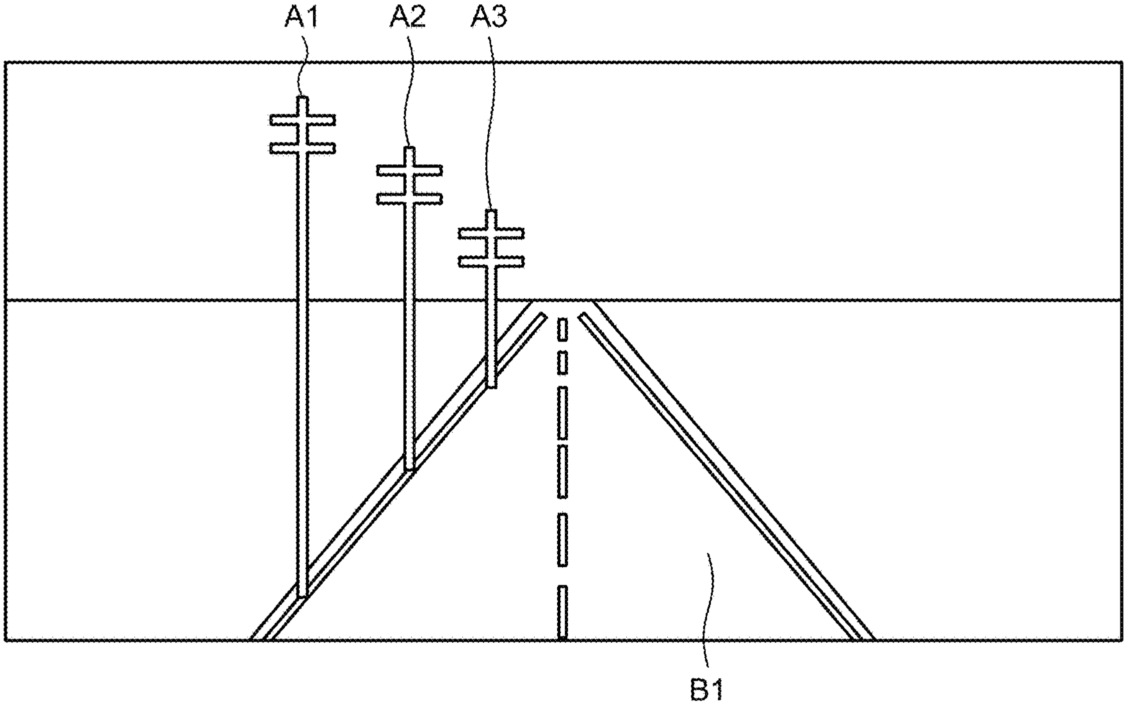
FIG. 3 is a diagram showing an example of image data on an image captured by the object detector according to the embodiment.
Figure 4:
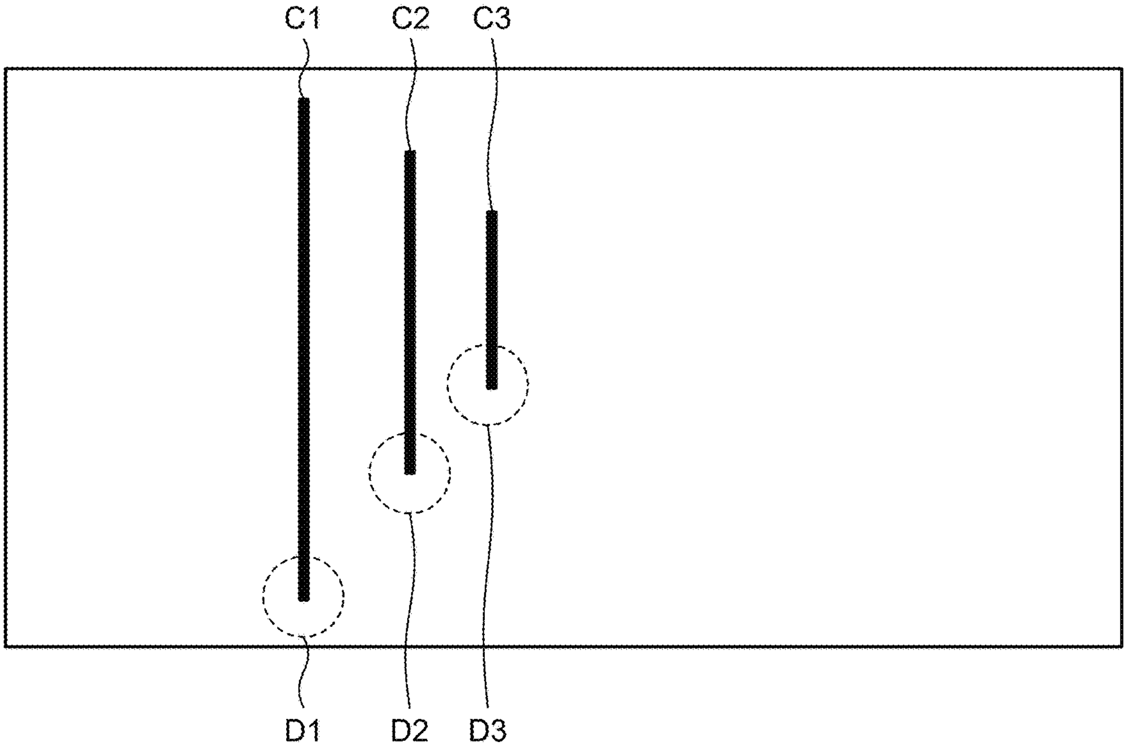
FIG. 4 is a diagram showing an example of data obtained after image processing is performed on the image data on the image captured by the object detector according to the embodiment.

FIG. 3 is a diagram showing an example of image data on an image captured by the object detector 100 according to the embodiment. FIG. 4 is a diagram showing an example of data obtained after image processing is performed on the image data on the image captured by the object detector 100 according to the embodiment. FIGS. 3 and 4 illustrate image data on a field in which utility poles A1, A2, and A3 exist as examples of a structure on a road surface B1. In order to recognize the utility poles A1, A2, and A3 which are structures, vertical components with respect to the road surface B1 are detected after edges having high linearity are detected from the image data. Examples of the edge detection method include a method for performing Hough transform on image data. It is possible to detect only an edge having high linearity from Hough-transformed image data. FIG. 4 illustrates an image diagram of the Hough-transformed image data from which only vertical components C1, C2, and C3 with respect to the road surface B1 have been extracted. As illustrated in FIG. 4, it is possible to detect positions of the structures by extracting pixel coordinates of points D1, D2, and D3 closest to the road surface B1 on the image and referring to the pixel coordinate-position conversion table 18.

Furthermore, the object recognition unit 10 of the camera image processor 4 recognizes the object on the basis of the captured-image data acquired in step S5 (step S13). The object recognition unit 10 recognizes a person, a vehicle, or the like, and detects an object type by using feature data obtained by machine learning or deep learning as a database. Next, the detection frame assignment unit 11 assigns a frame to the recognized object, and the detection frame pixel coordinate assignment unit 12 assigns pixel coordinates to a bottom side center of a frame portion (step S14).

The structure identity determination unit 23 of the fusion processor 5 performs identity determination processing for determining whether the position data from the radar 1 obtained in step S4 are identical to the position data on the structure from the camera 2 (step S9). As a result of this identity determination processing, the position data detected by the radar 1 and the pixel coordinates of the structure detected by the camera 2 are associated with each other. When successful in the identity determination in the identity determination processing (step S10: Yes), the structure identity determination unit 23 stores, in the fusion structure detection data storage unit 24, fusion structure detection data including position data on the structure detected by the radar 1 and pixel coordinate data from the camera 2 (step S11). The fusion structure detection data including the position data on the structure detected by the radar 1 and the pixel coordinate data from the camera 2 stored in the fusion structure detection data storage unit 24 are transferred to the conversion table update circuitry 19 of the camera image processor 4. The conversion table update circuitry 19 updates the pixel coordinate-position conversion table 18 with the transferred fusion structure detection data (the position data on the structure detected by the radar 1 and the pixel coordinate data from the camera 2) (step S12).

When unsuccessful in the identity determination in the identity determination processing (step S10: No), the structure identity determination unit 23 refers to the nonvolatile memory 27, and determines whether past fusion structure detection data (position data on the structure and pixel coordinate data from the camera 2) exist in the nonvolatile memory 27 (step S25). In a case where the past fusion structure detection data exist (step S25: Yes), for example, latest fusion structure detection data among the past fusion structure detection data are transferred to the conversion table update circuitry 19 of the camera image processor 4. The conversion table update circuitry 19 updates the pixel coordinate-position conversion table 18 with the transferred past fusion structure detection data (step S12). In a case where there is no past fusion structure detection data (step S25: No), the pixel coordinate-position conversion table 18 is not updated, and the process proceeds to step S15.

In step S15, the object position detection unit 13 of the camera image processor 4 detects the position of the recognized object by using pixel coordinates of the bottom side center of the frame portion corresponding to the recognized object assigned in step S14 and the pixel coordinate-position conversion table 18. At this time, since the pixel coordinate-position conversion table 18 has been updated on a real-time basis in step S12, the camera image processor 4 can detect the position of the object with high accuracy. The position and type of the detected object are stored in the camera object detection data storage unit 14 (step S16).

The object identity determination unit 20 of the fusion processor 5 performs identity determination processing for determining whether the position detected by the radar 1 acquired in step S4 is identical to the position detected by the camera 2 acquired in step S16 (step S17). As a result of this identity determination processing, the position and speed data detected by the radar 1 and object recognition data detected by the camera 2 are associated with each other. When the identity determination is unsuccessful (step S18: No), the detection data selection unit 21 outputs the position data and the object type detected by the camera 2 to the fusion object detection data storage unit 22 (step S19). The fusion object detection data storage unit 22 stores the input position data and object type detected by the camera 2. When the identity determination is successful (step S18: Yes), the detection data selection unit 21 outputs the position and speed data detected by the radar 1 and the position data and the object type detected by the camera 2 to the fusion object detection data storage unit 22 (step S20). The fusion object detection data storage unit 22 stores the input position and speed data detected by the radar 1 and the input position data and object type detected by the camera 2 (step S21).

The data on the position, speed, and object type of the object stored in the fusion object detection data storage unit 22 are output to the vehicle control unit 30 (step S22). The vehicle control unit 30 uses the data on the position, speed, and object type of the object acquired in step S22 for vehicle control (step S23). Thus, the object detection process ends. Thereafter, the object detection process proceeds to a next frame (step S24), and the same processing is repeatedly performed from step S1.

As described above, according to the embodiment, the pixel coordinate-position conversion table 18 is sequentially updated on a real-time basis with data on correspondence between position data detected by the radar signal processor 3 and pixel coordinates of the camera 2 stored when identity determination processing is successful which is processing for determining whether the position of the structure detected by the radar signal processor 3 is identical to the position of the structure detected by the camera image processor 4. Therefore, accuracy of position detection by the camera 2 can be improved to the level of accuracy of position detection by the radar 1.

Furthermore, in a case where the object identity determination unit 20 is unsuccessful in identity determination processing in the embodiment, control is performed in which data lost from the radar 1 are replaced with detection data on detection by the camera 2 such that position data on an object detected by the camera image processor 4 are used for vehicle control, and position data detected by the radar signal processor 3 are not used for vehicle control. Thus, it is possible to provide an object detector that can achieve high position detection accuracy when such control is performed. In addition, detection data on a structure having high radar reflection intensity are used to update the pixel coordinate-position conversion table 18. Therefore, the structure can be detected by each of the radar 1 and the camera 2. Thus, the fusion processor 5 can perform identity determination with high accuracy.

The configurations set forth in the above embodiment show examples of the subject matter of the present disclosure, and it is possible to combine the configurations with another known technique, and is also possible to partially omit or change the configurations without departing from the scope of the present disclosure.

Reference Signs List

1 radar; 2 camera; 3 radar signal processor; 4 camera image processor; 5 fusion processor; 6 distance detection unit; 7 speed detection unit; 8 horizontal angle detection unit; 9 radar detection data storage unit; 10 object recognition unit; 11 detection frame assignment unit; 12 detection frame pixel coordinate assignment unit; 13 object position detection unit; 14 camera object detection data storage unit; 15 structure recognition unit; 16 structure position detection unit; 17 camera structure detection data storage unit; 18 pixel coordinate-position conversion table; 19 conversion table update circuitry; 20 object identity determination unit; 21 detection data selection unit; 22 fusion object detection data storage unit; 23 structure identity determination unit; 24 fusion structure detection data storage unit; 25 camera internal parameter storage unit; 26 camera external parameter storage unit; 27 nonvolatile memory; 30 vehicle control unit; 100 object detector.

The invention claimed is:

1. An object detector comprising:

a radar signal processor configured to detect positions and speeds of an object and a structure by processing signals received from a radar;

a camera image processor:

including a first conversion table that stores a correspondence between pixel coordinates of a camera and positions with respect to a vehicle in an imaging space of the camera; and configured to detect positions and types of the object and the structure based on captured-image data from the camera and the first conversion table; and a fusion processor configured to:

perform a first identity determination processing to determine whether the position of the object detected by the radar signal processor is identical to the position of the object detected by the camera image processor;

perform a second identity determination processing to determine whether the position of the structure detected by the radar signal processor is identical to the position of the structure detected by the camera image processor; and use a result of the first identity determination processing and a result of the second identity determination processing for vehicle control, wherein the camera image processor includes a conversion table update circuitry configured to update the first conversion table with data on correspondence between position data detected by the radar signal processor, when the second identity determination processing is successful, and the pixel coordinates of the camera.

2. The object detector according to claim 1, wherein when unsuccessful in identity determination in the first identity determination processing, the fusion processor is configured:

to use the position data on the object detected by the camera image processor for vehicle control; and not to use the position data detected by the radar signal processor for vehicle control.

* * * * *